United States Patent
Niikura et al.

(10) Patent No.: US 6,761,030 B2
(45) Date of Patent: Jul. 13, 2004

(54) WASTE HEAT RECOVERY DEVICE OF MULTI-CYLINDER INTERNAL COMBUSTION ENGINE

(75) Inventors: Hiroyuki Niikura, Wako (JP); Tsuneo Endoh, Wako (JP); Yuichi Itoh, Wako (JP); Naoki Ohta, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/149,016

(22) PCT Filed: Dec. 8, 2000

(86) PCT No.: PCT/JP00/08703
§ 371 (c)(1),
(2), (4) Date: Oct. 28, 2002

(87) PCT Pub. No.: WO01/42626
PCT Pub. Date: Jun. 14, 2001

(65) Prior Publication Data
US 2003/0089110 A1 May 15, 2003

(30) Foreign Application Priority Data
Dec. 10, 1999 (JP) .......................................... 11/351862

(51) Int. Cl.[7] ................................................ F02G 3/00
(52) U.S. Cl. ............................. 60/618; 60/616; 60/614
(58) Field of Search ........................... 60/614, 616, 618

(56) References Cited

U.S. PATENT DOCUMENTS

| | | | | |
|---|---|---|---|---|
| 3,570,462 A | * | 3/1971 | Hauk | 123/547 |
| 4,003,345 A | * | 1/1977 | Bradley | 123/3 |
| 5,761,905 A | * | 6/1998 | Yamada et al. | 60/322 |
| 5,881,553 A | * | 3/1999 | Steenackers et al. | 60/299 |

FOREIGN PATENT DOCUMENTS

| | | |
|---|---|---|
| JP | 56-156407 A | 12/1981 |
| JP | 3-151519 A | 6/1991 |
| JP | 4-353212 A | 12/1992 |
| JP | 5-340241 A | 12/1993 |
| JP | 7-224727 A | 8/1995 |
| JP | 7-259548 A | 10/1995 |

* cited by examiner

*Primary Examiner*—Hoang Nguyen
(74) *Attorney, Agent, or Firm*—Birch, Stewart, Kolasch & Birch, LLP

(57) ABSTRACT

A waste heat recovering device for a multi-cylinder internal combustion engine, wherein among a plurality of exhaust pipes extending from cylinders of a multi-cylinder internal combustion engine, a plurality of exhaust pipes unlikely to cause exhaust interference are collected to form one or more collecting pipes. A heat exchanger for recovering heat of exhaust gas is provided in the one or more collecting pipes. Therefore, a waste heat recovering device can be provided, in which the number of heat exchangers is reduced compared to the number of cylinders of the multi-cylinder internal combustion engine to reduce rest periods of the heat exchanger and reduce spaces occupied by the heat exchanger.

2 Claims, 10 Drawing Sheets

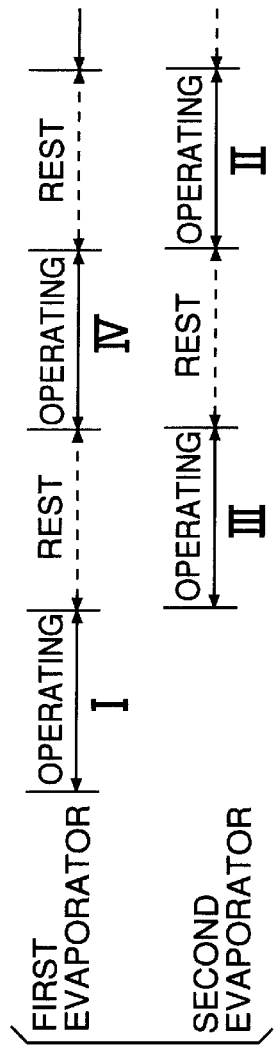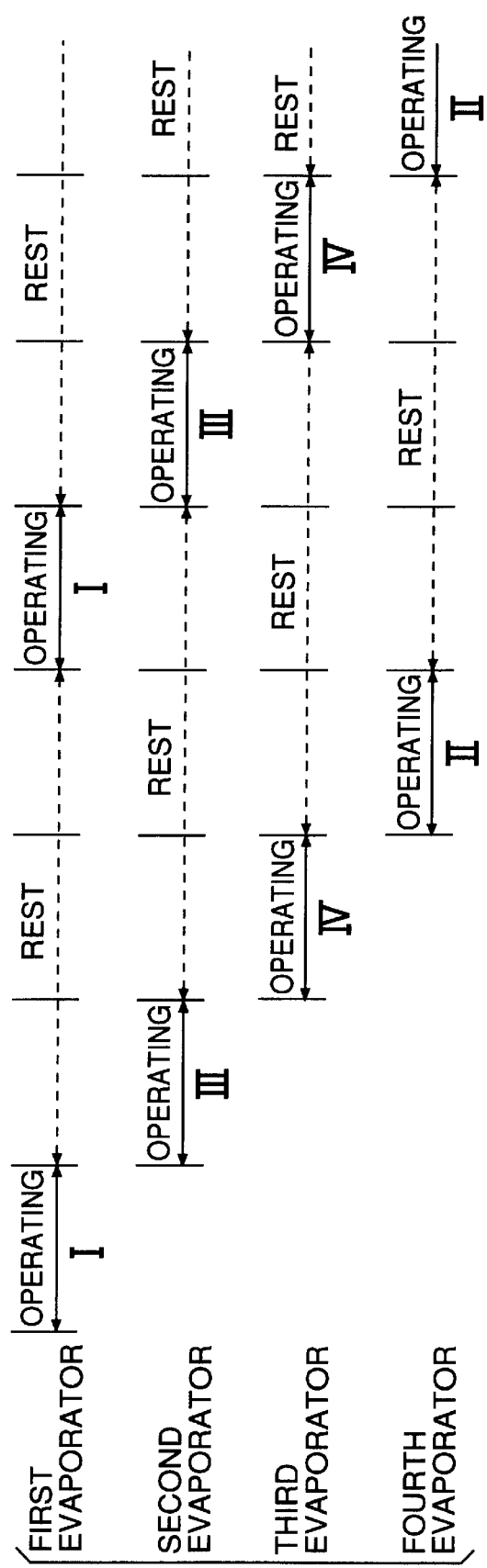

WASTE HEAT RECOVERY DEVICE OF MULTI-CYLINDER INTERNAL COMBUSTION ENGINE

This application is the national phase under 35 U.S.C. § 371 of PCT International Application No. PCT/JP00/08703 which has an International filing date of Dec. 8, 2000, which designated the United States of America.

FIELD OF THE INVENTION

The present invention relates to a waste heat recovering device for a multi-cylinder internal combustion engine.

BACKGROUND ART

Known as waste heat recovering devices of this type are a device including a heat exchanger in each of a plurality of exhaust pipes extending from cylinders of a multi-cylinder internal combustion engine (see Japanese Patent Application Laid-open No. 56-156407, for example) and a device including a heat exchanger in a collecting pipe which is collection of a plurality of exhaust pipes extending from cylinders of a multi-cylinder internal combustion engine (see Japanese Patent Application Laid-open No. 5-340241, for example).

However, the former needs as many heat exchangers as the cylinders, and thus has a problem that, for example, after operation of a heat exchanger in the first cylinder in firing order, further operation thereof cannot be performed until just before an end of an exhaust process of the last cylinder in the firing order, causing a long rest period of each heat exchanger, and each heat exchanger is thus cooled during the period to reduce heat recovery efficiency. Further, if the former is for vehicle use, it has problems that an evaporator is provided in each cylinder to increase a size of an engine itself, for example, by increasing an interval between adjacent cylinders for the evaporator to be mounted, and that the evaporator occupies a large space in an engine compartment to result in an impediment to securing spaces for other components to be located.

On the other hand, the latter has a problem that when a collecting portion is formed at a long distance from an exhaust port in order to avoid exhaust interference, and an evaporator is provided in the collecting portion, temperature of exhaust gas decreases to reduce heat recovery efficiency by the evaporator. On the contrary, when the collecting portion is provided at a short distance from the exhaust port without considering the exhaust interference in order to utilize high-temperature exhaust gas, the exhaust interference reduces output of the internal combustion engine and thus exhaust pulses, thereby reducing the heat recovery efficiency by the evaporator.

DISCLOSURE OF THE INVENTION

The present invention has an object to provide a waste heat recovering device for a multi-cylinder internal combustion engine in which output of a multi-cylinder internal combustion engine is rarely reduced, and the number of heat exchangers is reduced compared to the number of cylinders of the engine to reduce rest periods of the heat exchanger and reduce spaces occupied by the heat exchanger.

To attain the above described object, the present invention provides a waste heat recovering device for a multi-cylinder internal combustion engine including one or more collecting pipes that are collection of a plurality of exhaust pipes unlikely to cause exhaust interference, among a plurality of exhaust pipes extending from cylinders of a multi-cylinder internal combustion engine, a heat exchanger for recovering heat of exhaust gas being provided in the one or more collecting pipes.

When exhaust pipes extending from a plurality of cylinders whose exhaust periods partially overlap are collected with their lengths reduced, exhaust interference occurs to reduce output of a multi-cylinder internal combustion engine. However, even when exhaust pipes extending from a plurality of cylinders whose exhaust periods do not overlap are collected with their lengths reduced, exhaust interference is unlikely to occur, thus rarely reducing the output of the multi-cylinder internal combustion engine.

Configured as described above in this view, the output of the multi-cylinder internal combustion engine is rarely reduced even when the exhaust pipes are collected with their lengths reduced. Further, the number of the heat exchangers is smaller than the number of the cylinders, thus rest periods of the heat exchangers can be reduced.

Reduction in the length of the exhaust pipe as described above allows the exhaust gas to be introduced in the heat exchanger with its temperature reduction minimized, and also the rest period of the heat exchanger is reduced, thereby allowing increase in heat recovery efficiency of the exhaust gas. Further, attendant on the reduction of the heat exchangers, spaces occupied by them can be reduced to achieve reduction in size and cost of the device, which is suitable for vehicle use.

BRIEF DESCRIPTION OF THE DRAWINGS

FIG. 4A and FIG. 4B illustrate relationships between operating periods and rest periods in a plurality of evaporators;

BEST MODE FOR CARRYING OUT THE INVENTION

Figure 1:
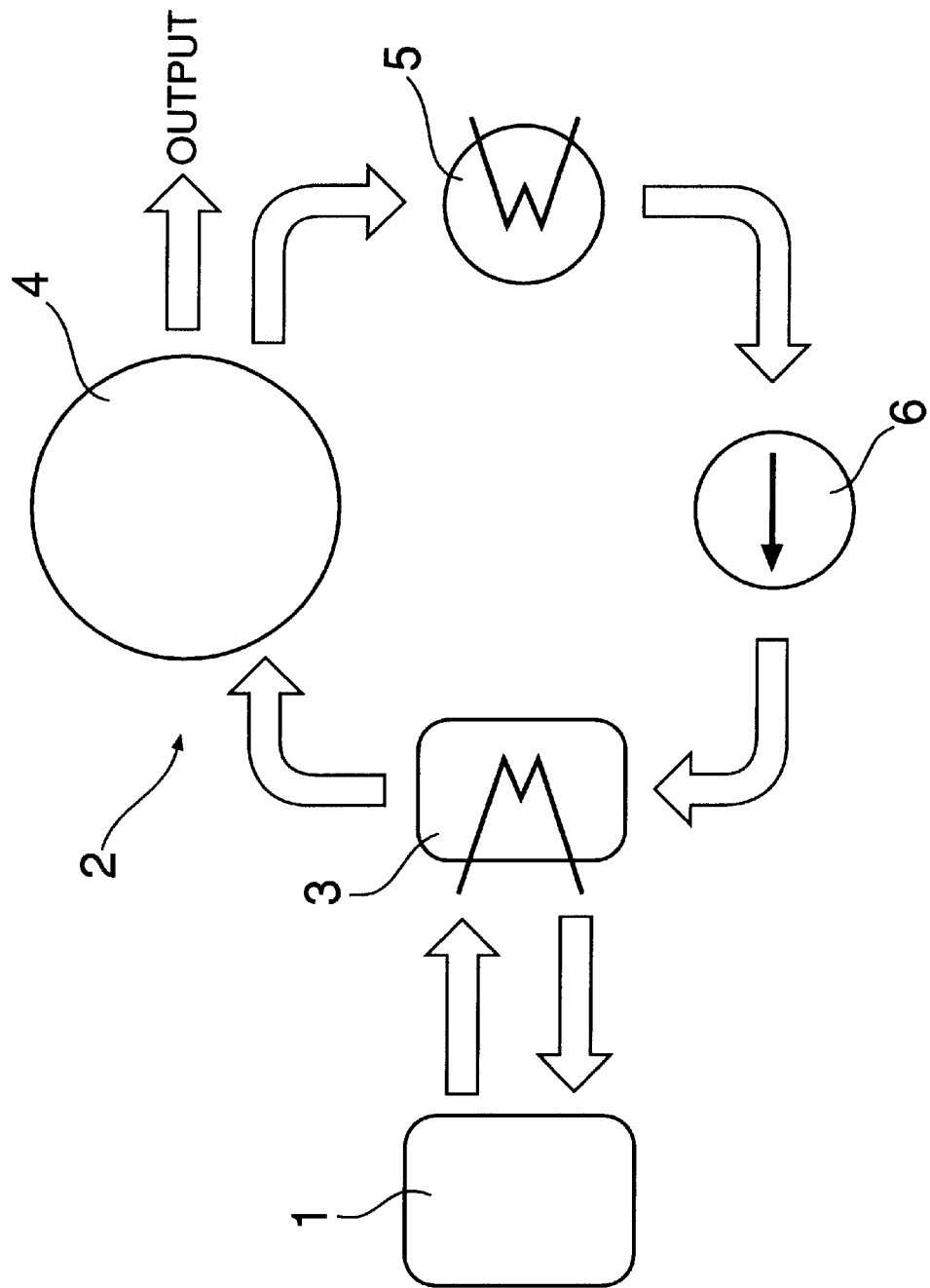
FIG. 1 is a schematic view of a waste heat recovering device for an internal combustion engine.

In FIG. 1, a waste heat recovering device 2, to which Rankine cycle is applied, of a multi-cylinder internal combustion engine 1 comprises an evaporator 3 as a heat exchanger for generating a vapor having a raised temperature and a raised pressure, that is, a raised temperature/pressure vapor, using waste heat, for example, the exhaust gas of the internal combustion engine 1 as a heat source; an expander 4 for producing output by expansion of the raised temperature/pressure vapor; a condenser 5 for liquefying a vapor having a dropped temperature and a dropped pressure, that is, dropped-temperature/pressure vapor discharged from the expander 4 after the expansion; and a supply pump 6 for supplying liquid, for example, water, from the condenser 5 to the evaporator 3.

Figure 2:
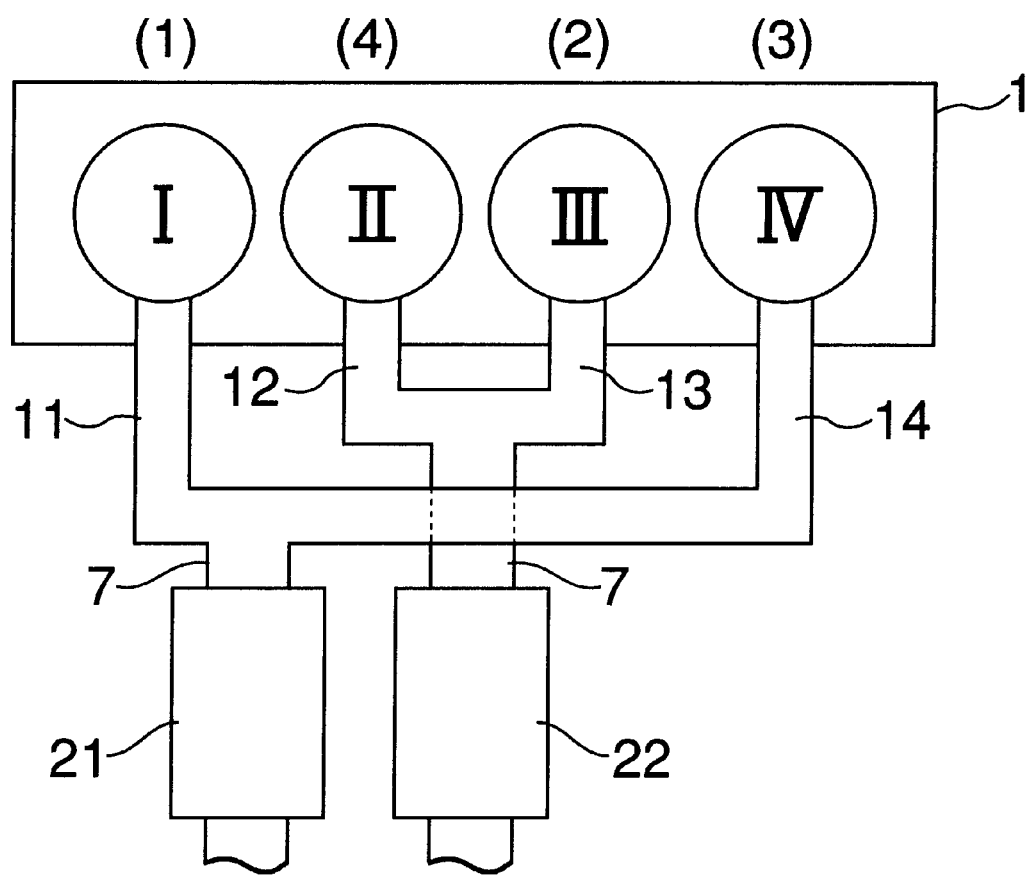
FIG. 2 schematically illustrates a relationship between an in-line four-cylinder internal combustion engine and an evaporator.
Figure 3:
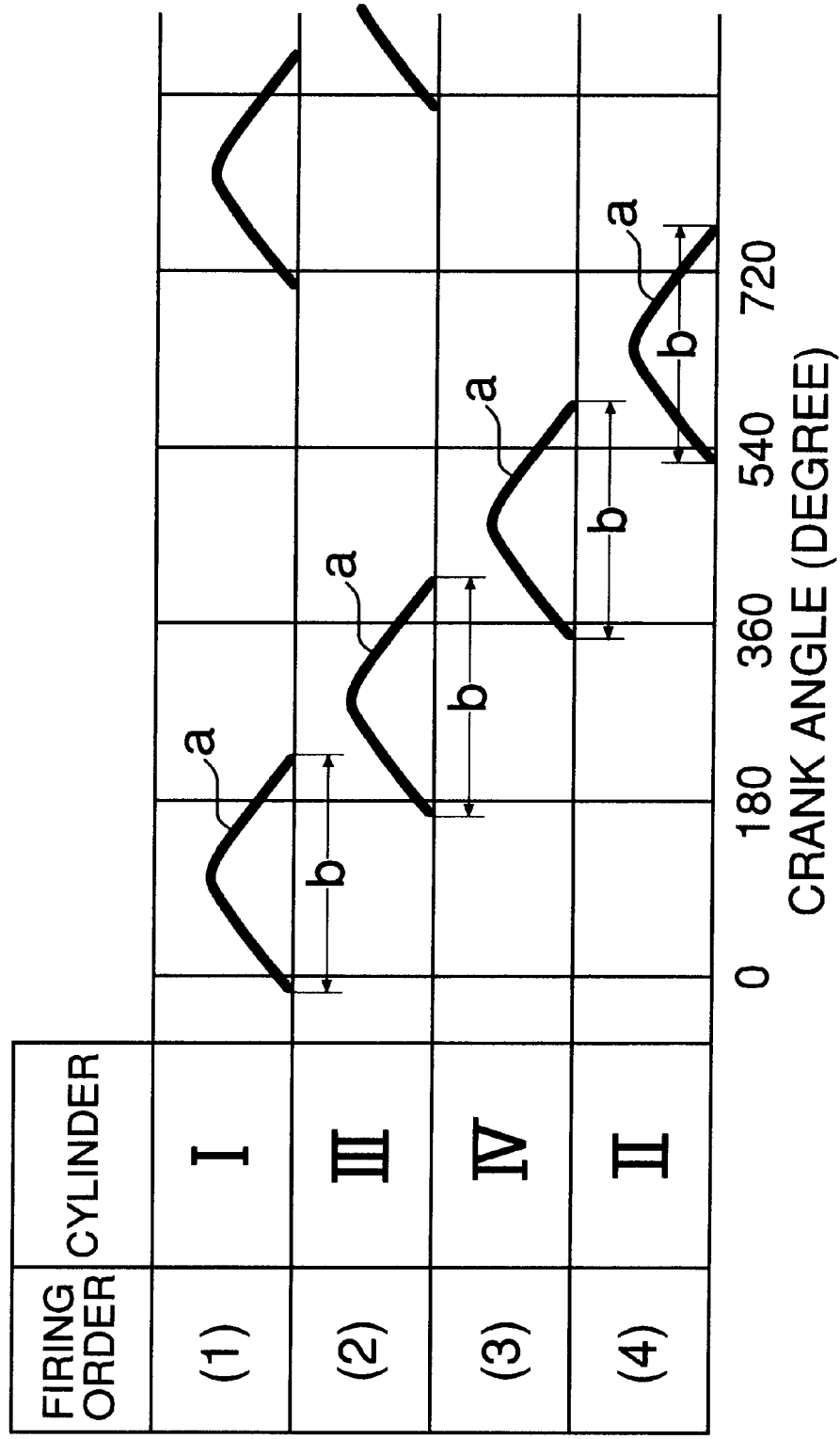
FIG. 3 illustrates a relationship between a crank angle in the in-line four-cylinder internal combustion engine and an exhaust period of each cylinder.

In FIG. 2, a multi-cylinder internal combustion engine, in this case, an in-line four-cylinder internal combustion engine 1 has first to fourth cylinders I to IV, and their firing order is the first cylinder I, third cylinder III, fourth cylinder IV, and second cylinder II as denoted by Arabic numerals in parentheses (1) to (4) in FIGS. 2 and 3. In FIG. 3, an angle line a is a diagram of a lift of an exhaust valve, thus an interval from one edge to the other edge of the angle line a shows a period when the exhaust valve is opened, that is, an exhaust period b. Therefore, exhaust periods b of the first and third cylinders I, III; the third and fourth cylinders III, IV; the fourth and second cylinders IV, II; and the second and first cylinders II, I partially overlap, so that exhaust interference occurs when, for example, exhaust pipes extending from the first and third cylinders I, III are collected with their lengths reduced.

In this case, for the first and fourth-cylinders I, IV and the second and third cylinders II, III, their exhaust periods b do not overlap and hence, the exhaust interference rarely occurs. Thus, as shown in FIG. 2, exhaust pipes 11, 14 extending from the first and fourth cylinders I, IV and exhaust pipes 12, 13 extending from the second and third cylinders II, III unlikely to cause the exhaust interference are shortened, and two collecting pipes 7 that are collection of the exhaust pipes 11, 14 and 12, 13, respectively are formed and provided with first and second evaporators 21, 22, respectively.

By the configuration as described above, even when the exhaust pipes 11, 14 and 12, 13 are collected with their lengths reduced, the exhaust interference is unlikely to occur, thus rarely reducing the output of the internal combustion engine 1. The number of evaporators is "two", which is smaller than "four", the number of cylinders, so that rest periods of the first and second evaporators 21, 22 can be reduced.

FIG. 4A shows operating periods and rest periods of the first and second evaporators 21, 22 in an embodiment in FIG. 2, and FIG. 4B shows operating periods and rest periods of the first to fourth evaporators in a conventional example. In the drawings, reference characters I to IV denote the first to fourth cylinders in an exhaust process. As is clearly shown in FIGS. 4A and 4B, the rest period of each of the first and second evaporators 21, 22 in the embodiment is one third that of the conventional example since the first and second evaporators 21, 22 are alternately operated.

Reduction in lengths of the exhaust pipes 11 to 14 as described above allows the exhaust gas to be introduced in the first and second evaporators 21, 22 with its temperature reduction minimized, and also the rest periods of the first and second evaporators 21, 22 are reduced, thereby allowing significant increase in heat recovery efficiency of the exhaust gas.

Further, attendant on the reduction of the heat exchangers, spaces occupied by them can be reduced to achieve reduction in size and cost of the device, which is suitable for vehicle use.

Figure 5:
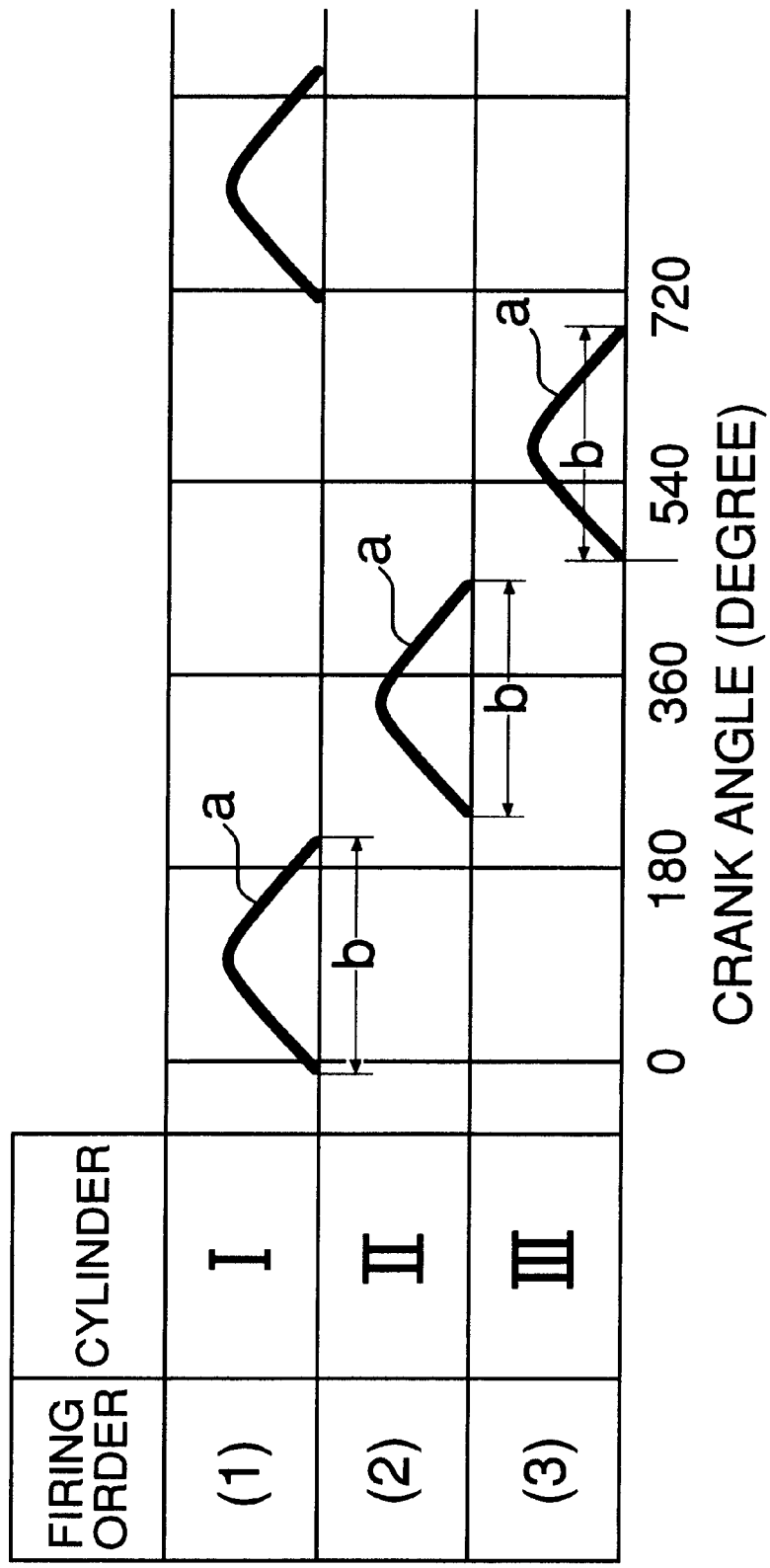
FIG. 5 illustrates a relationship between a crank angle in an in-line three-cylinder internal combustion engine and an exhaust period of each cylinder.
Figure 6:
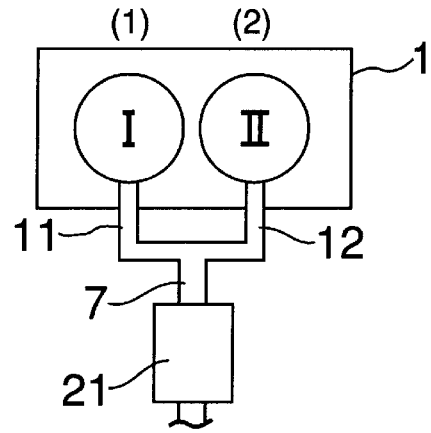
FIG. 6 schematically illustrates a relationship between an in-line two-cylinder internal combustion engine and an evaporator.
Figure 7:
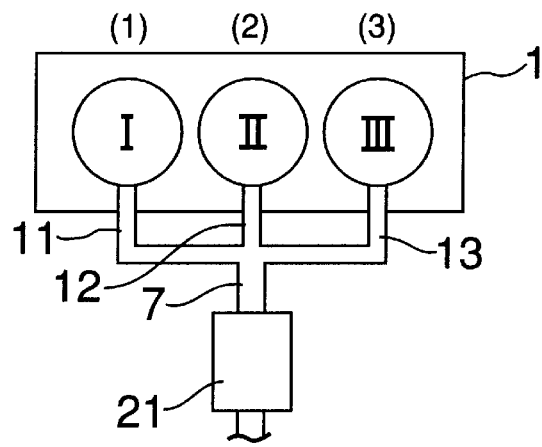
FIG. 7 schematically illustrates a relationship between the in-line three-cylinder internal combustion engine and an evaporator.
Figure 8:
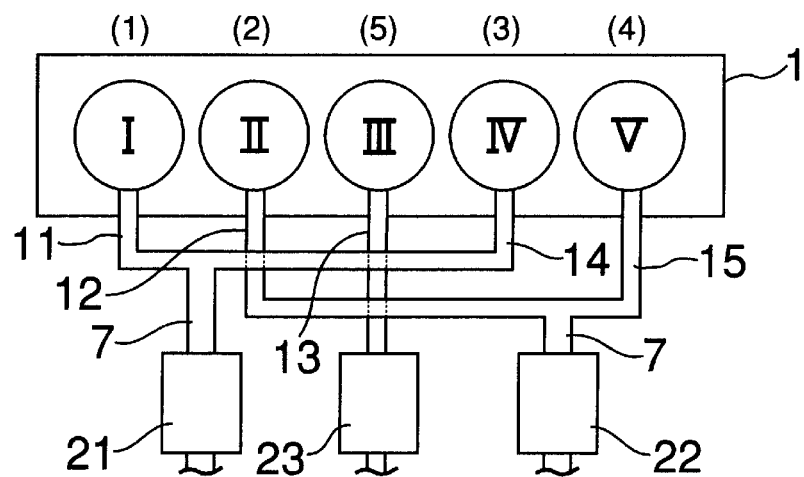
FIG. 8 schematically illustrates a relationship between an in-line five-cylinder internal combustion engine and an evaporator.
Figure 9:
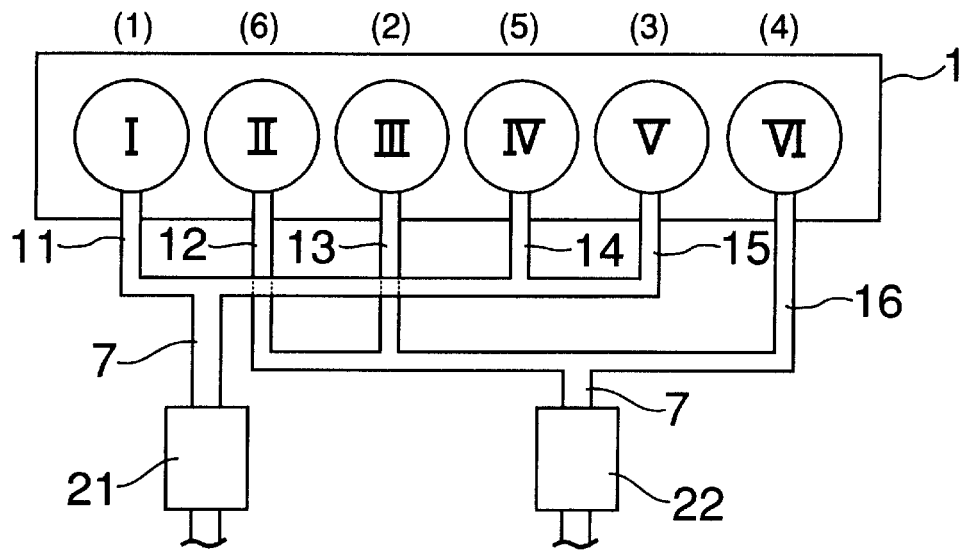
FIG. 9 schematically illustrates a relationship between an in-line six-cylinder internal combustion engine and an evaporator.
Figure 10:
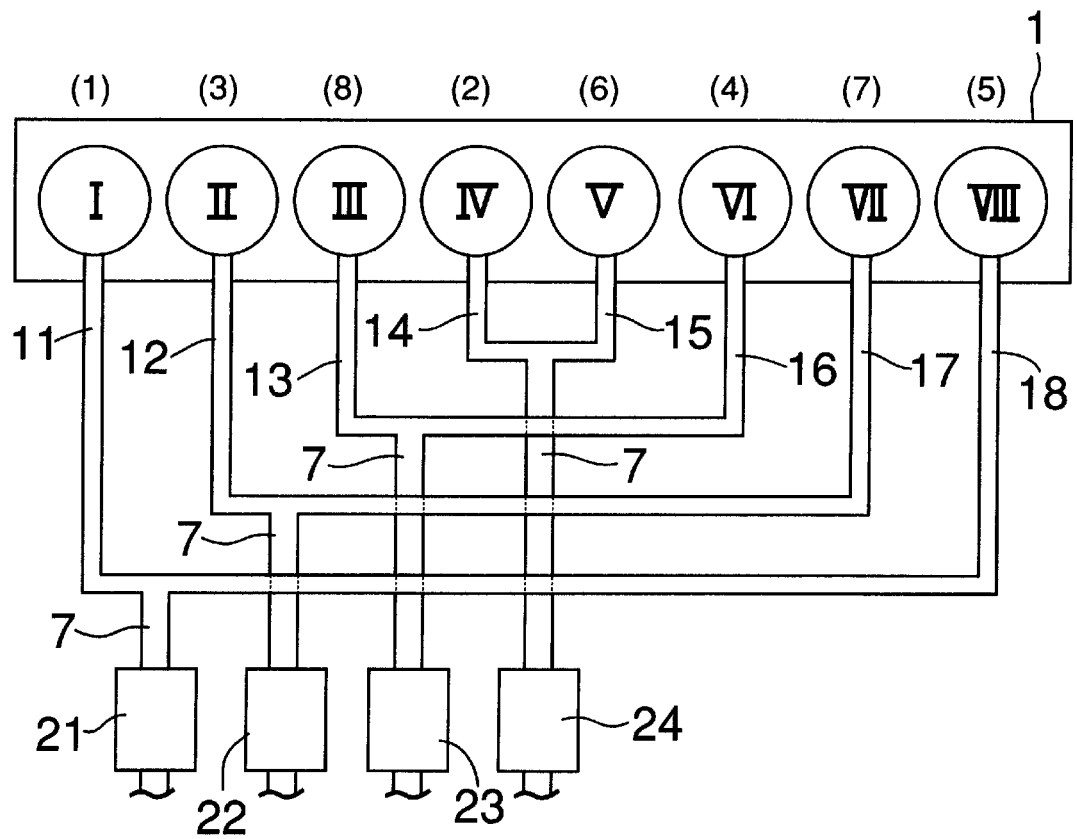
FIG. 10 schematically illustrates a relationship between an in-line eight-cylinder internal combustion engine and an evaporator.
Figure 11:
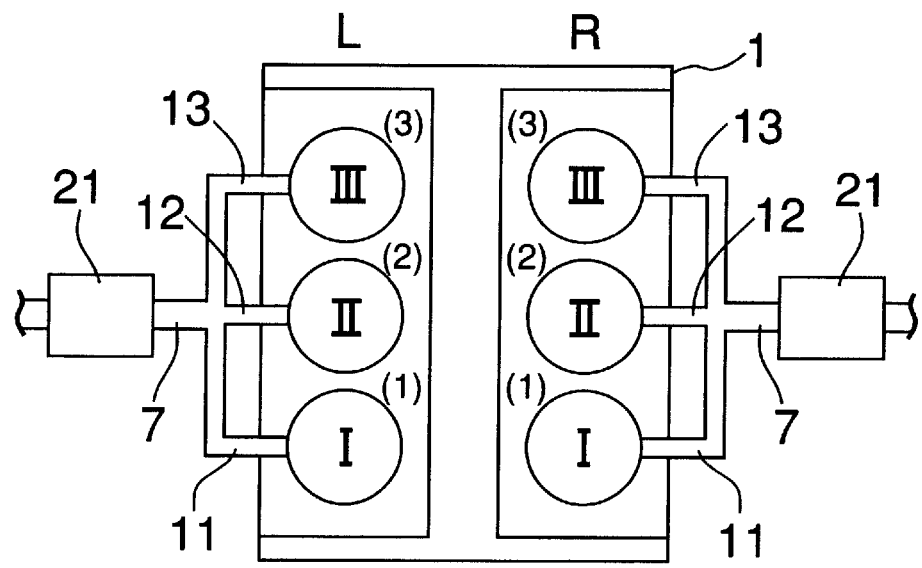
FIG. 11 schematically illustrates a relationship between a V-type six-cylinder internal combustion engine and an evaporator.
Figure 12:
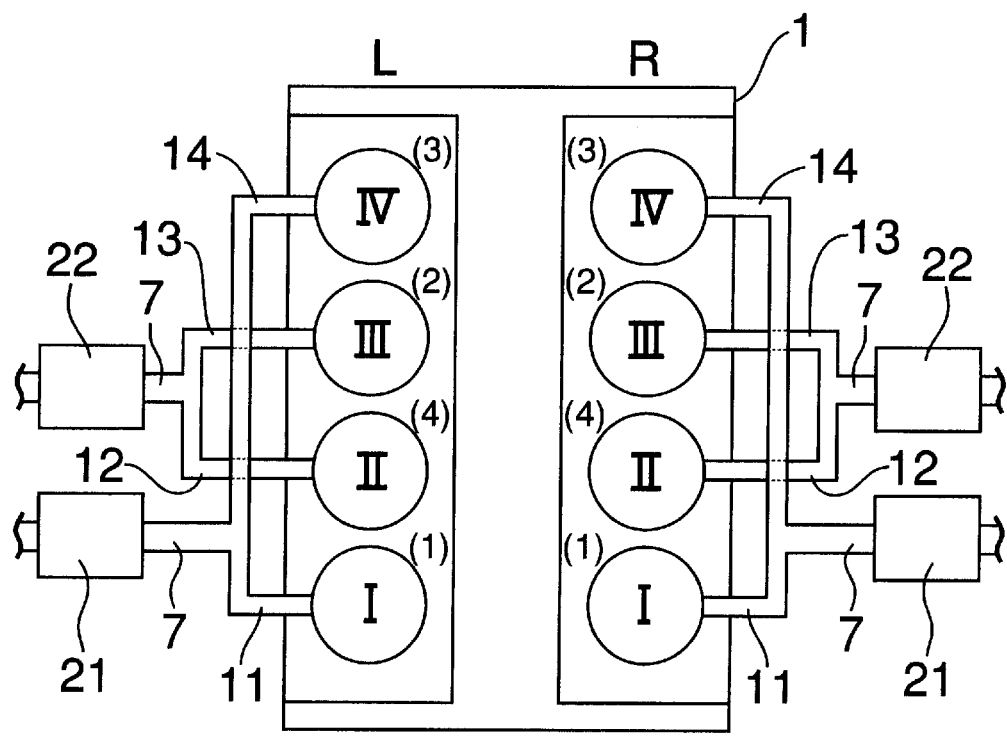
FIG. 12 schematically illustrates a relationship between a V-type eight-cylinder internal combustion engine and an evaporator.
Figure 13:
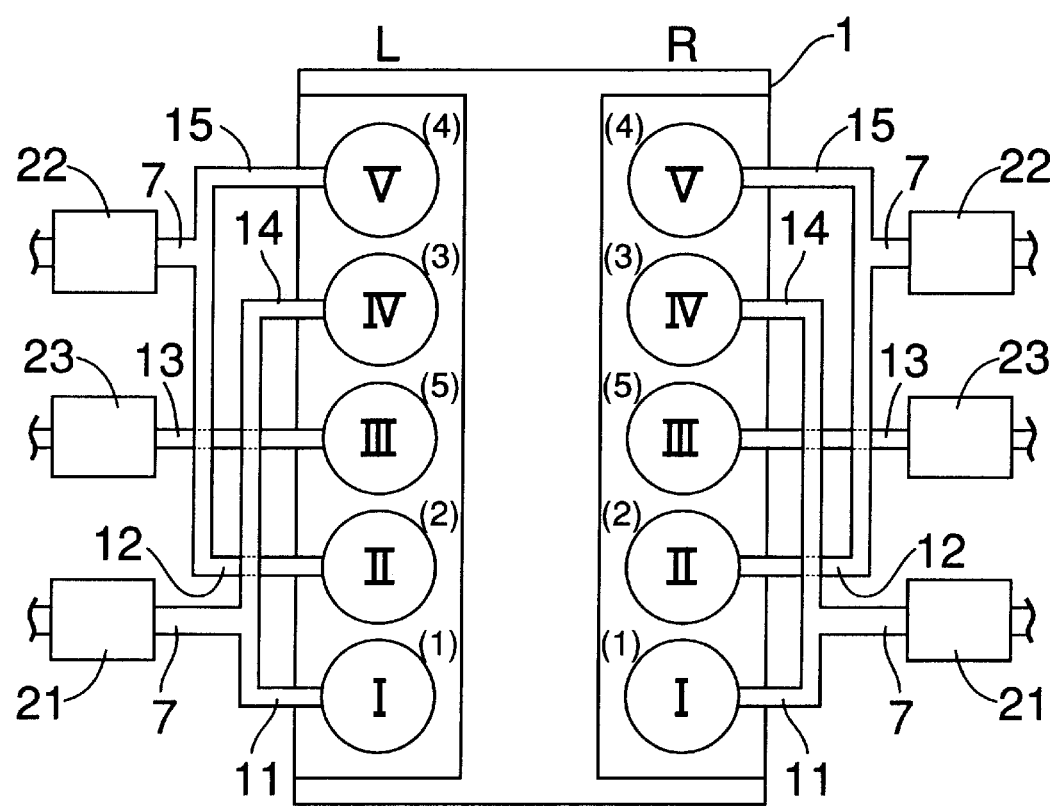
FIG. 13 schematically illustrates a relationship between a V-type ten-cylinder internal combustion engine and an evaporator.
Figure 14:
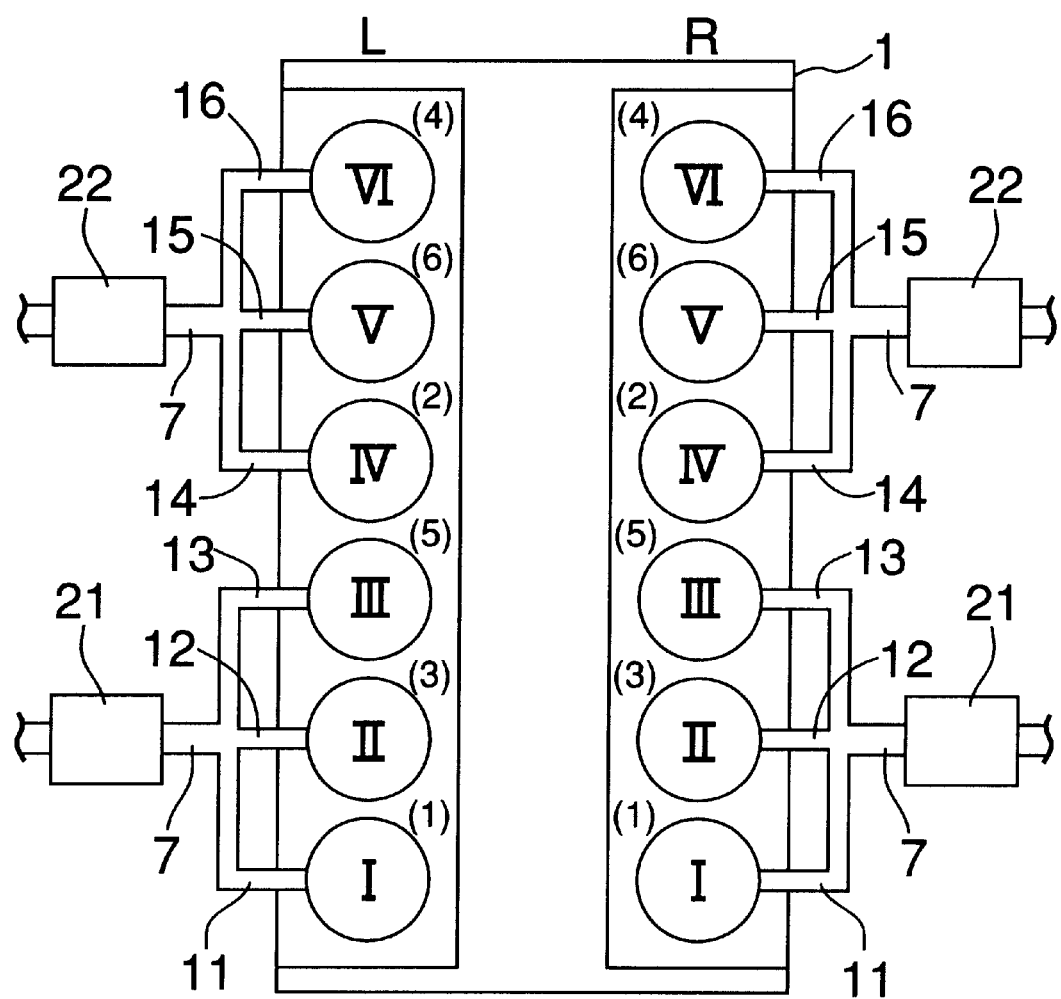
FIG. 14 schematically illustrates a relationship between a V-type twelve-cylinder internal combustion engine and an evaporator.

The above described exhaust interference becomes a problem for in-line four- or more cylinder internal combustion engines, and in a three-cylinder internal combustion engine, explosion intervals are long at crank angles, so that exhaust periods do not partially overlap among first to three cylinders I to III as shown in FIG. 5, thus exhaust interference is unlikely to occur. This applies to a two cylinder internal combustion engine. The present invention is also applied to a two- or three-cylinder internal combustion engine.

FIGS. 6 to 10 show examples of various kinds of in-line multi-cylinder internal combustion engines 1 to which the invention is applied. In the drawings, Roman numerals I to VIII denote first to eighth cylinders, Arabic numerals in parentheses denote firing order of the cylinders, reference numerals 15 to 18 denote exhaust pipes, and reference numerals 23 and 24 denote third and fourth evaporators. In an in-line five-cylinder internal combustion engine 1 in FIG. 8, an exhaust pipe 13 of a third-cylinder III is separately provided with a third evaporator 23. In an in-line three-or less cylinder internal combustion engines, the exhaust pipes are shortened and collected into one. On the other hand, in an in-line four-, five- or six-cylinder internal combustion engine, with respect to an nth cylinder in the firing order, a cylinder to be collected is an n+2 or more cylinder in the firing order with one or more places in the firing order skipped. In an in-line seven-, eight- or nine-cylinder internal combustion engine, with respect to an nth cylinder in firing order, a cylinder to be collected is an n+3 or more cylinder in the firing order with two or more places in the firing order skipped. In an in-line ten-, eleven- or twelve-cylinder internal combustion engine, with respect to an nth cylinder in firing order, a cylinder to be collected is an n+4 or more cylinder in the firing order with three or more places in the firing order skipped.

FIGS. 11 to 14 show examples of various kinds of V-type multi-cylinder internal combustion engines to which the invention is applied. In the drawings, reference character L denotes a left column and reference character R denotes a right column, and Roman numerals and Arabic numerals in parentheses denote the same as described above. In this case, assuming that each of the left column L and the right column R is an in-line engine, cylinders to be collected are selected in accordance with the case of the in-line multi-cylinder internal combustion engine.

From the in-line multi-cylinder internal combustion engines 1 in FIGS. 6 to 10 and the V-type multi-cylinder internal combustion engines 1 in FIGS. 11 to 14, it is apparent that the number of evaporators is smaller than the number of cylinders.

What is claimed is:
1. A waste heat recovering device for a multi-cylinder internal combustion engine, comprising:

n, where n is greater than 1, exhaust pipes extending respectively from n cylinders of the multi-cylinder internal combustion engine;

at least one and less than n collecting pipes for collecting exhaust from said n exhaust pipes;

a heat exchanger for recovering heat of exhaust gas being provided in each of said collecting pipes;

where each of said collecting pipes are connected to exhaust pipes of cylinders spaced in firing order so as to reduce exhaust interference and situated at a distance from corresponding cylinders which is short enough to normally cause exhaust interference;

where a number of heat exchangers provided is less than the number n of the cylinders and a total of periods when each heat exchanger receives a supply of exhaust gas per cycle of the engine is longer than a period of one exhaust stroke of each cylinder.

2. A waste heat recovering device for a multi-cylinder internal combustion engine according to claim 1, further comprising a Rankine cycle system having an evaporator for generating a vapor with a raised pressure, using exhaust gas as a heat source; an expander for producing output by expansion of the vapor; a condenser for liquefying a vapor, which is exhausted from the expander, with a dropped pressure after said expansion; and a supply pump for supplying liquid from the condenser to said evaporator, said heat exchanger functioning as said evaporator.

* * * * *